H. E. WEBER.
CUSPIDOR.
APPLICATION FILED OCT. 3, 1908.

924,515.

Patented June 8, 1909.

WITNESSES
Jos. J. Hosler.
Ruth W. Miller

INVENTOR
Henry E. Weber
BY
Harry Frease.
ATTORNEY ized by the interposition between the neck of the bowl and the socket of the bracket of a flexible collar which is adapted to rigidly connect

UNITED STATES PATENT OFFICE.

HENRY E. WEBER, OF CANTON, OHIO, ASSIGNOR TO THE WEBER DENTAL MANUFACTURING COMPANY, OF CANTON, OHIO, A CORPORATION OF OHIO.

CUSPIDOR.

No. 924,515.　　　Specification of Letters Patent.　　　Patented June 8, 1909.

Application filed October 3, 1908. Serial No. 456,036.

*To all whom it may concern:*

Be it known that I, HENRY E. WEBER, a citizen of the United States, residing at Canton, in the county of Stark and State of Ohio, have invented a new and useful Improvement in Cuspidors, of which the following is a specification.

The invention relates to a cuspidor bowl usually made of glass, porcelain or other hard inflexible material, and attached to or supported on a bracket fastened on the side of a dental or other chair; and the object of the improvement is to provide means for connecting or supporting the cuspidor on the bracket in such a manner that it can be readily applied thereon and removed therefrom without the use of any packing, screws or flanged or shouldered members. The primary difficulty which is experienced in connecting such a bowl on a bracket, arises from the fact that the bracket is usually made of cast iron or other metal, the same being, like the bowl, a hard inflexible material, and unless the one member is shaped and ground to neatly fit the other, some means, usually a form of packing, must be employed to make a tight joint, and one which will not tend to break the brittle body of the cuspidor. A further objection to the use of packing and other forms of joints is in the fact that the same will deteriorate with use and must necessarily be renewed from time to time when the bowl is removed and replaced. These difficulties are obviated and the objects of the invention are attained by providing an intervening collar made of sheet metal or other flexible and preferably elastic material, the lower end of which is tapered and adapted to be wedged in a similarly tapered socket formed in the bracket, and the upper end of which is flared in the form of an inverted bell to receive the similarly shaped neck of the bowl, whereby the flexibility of the collar adapts it to neatly fit the rigid socket of the bracket and the rigid neck of the bowl.

The invention, thus set forth in general terms, is illustrated in the accompanying drawings, forming part hereof, in which—

Figure 1:
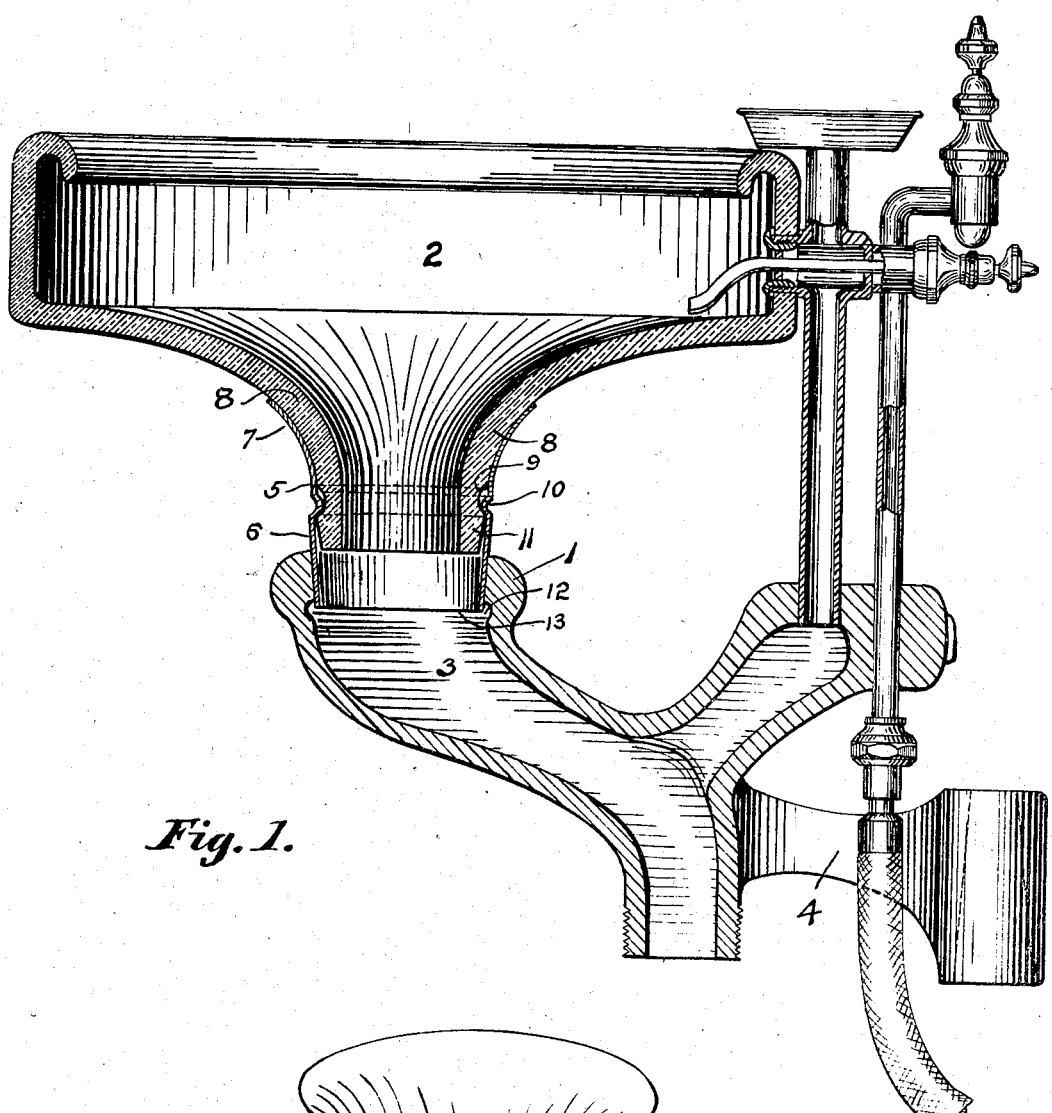
Figure 2:
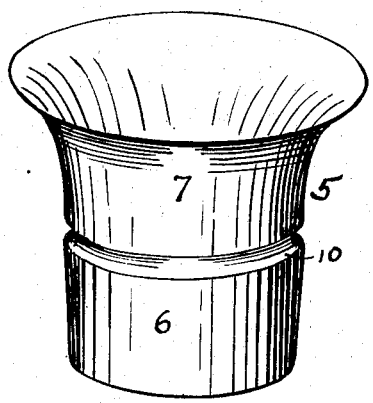

Figure 1 is a vertical section of a cuspidor bowl and its bracket connected by the flexible collar; and Fig. 2, a detached perspective view of the flexible collar.

Similar numerals refer to similar parts throughout the drawings.

The annular socket 1 for the bowl 2 is formed in the upper end of the outlet tube 3 which comprises part of the bracket and is formed or attached on the shank 4 thereof, and the socket is preferably slightly tapered as the zone of an inverted cone. The connecting collar 5 is spun or otherwise formed of sheet metal or other similar flexible and preferably elastic material, and its lower end 6 is preferably slightly tapered to conform to the tapered socket of the bracket, so that when the collar is inserted and forced therein, the flexibility of the collar permits the lower end to adapt itself readily to any unevenness or irregularities there may be in the form or shape of the socket.

The upper end 7 of the connecting collar is flared outward in the form of an inverted bell in such a manner that it will fit the similarly flared portion 8 of the neck of the bowl. It is evident that by inserting the neck of the bowl into the flared collar, the flexibility of the same permits the flared portion of the collar to adapt itself to any ordinary unevenness or irregularity in the form or shape of the neck of the bowl; and that when the bowl is slightly pressed into the collar, secure and tight joints are made between the bracket socket and the connecting collar, and between the collar and the neck of the bowl, in each case by the wedge action of the one in the other. These joints are of such a character that the bowl can be readily removed from the bracket by lifting it from the collar, or with the collar from the bracket, after giving it a slight twist, if the same is necessary.

The junction of the neck of the bowl with the collar can be made more positive, if desired, by providing the external annular groove 9 in the neck of the bowl and the internal annular bead 10 in the collar, which bead is adapted to be expanded over the lower end 11 of the neck and to contract into the groove thereof, by reason of the flexibility and elasticity of the collar. By means of the groove and bead junction, the bowl is releasably locked in the collar and a more positive connection is made between these parts, but it will be understood that this feature of construction is not essential to the general idea of connecting the bracket and the bowl by means of an intervening flexible collar.

When the parts are so proportioned and arranged that the lower end 11 of the neck of the bowl extends down near to or inside the cavity of the bracket, this portion of the neck is preferably made slightly smaller than the tapered lower end of the collar so that the collar will be free to adjust itself to the exact form and shape of the cavity. And it is also preferred to provide the annular recess 12 in the drain pipe around the lower edge 13 of the connecting collar, so that this edge will stand free from the wall of the drain pipe, and thereby shield the collar and socket joint from water flowing through the cuspidor. And it will be understood that the particular method of fastening the connecting collar to the bracket which is illustrated and described herein, is not essential to the more general feature of the invention which pertains to the use of a flexible collar having its upper end flared to fit and adapt itself to the exact form and shape of the neck of the cuspidor.

What I claim as my invention, and desire to secure by Letters Patent, is—

1. A bracket having a tapered socket therein, a bowl having a flared neck on its lower side, and an intervening flexible elastic collar having its lower end tapered to fit in the bracket-socket and its upper end flared to fit around the bowl-neck, there being an external groove in the bowl-neck and an internal annular bead in the collar adapted to engage in the groove.

2. A bracket including a drain pipe having a tapered socket in its upper end, a bowl having a flared neck on its lower side, and an intervening flexible collar having its lower end tapered to fit in the pipe-socket and its upper end flared to fit around the bowl-neck, there being an annular recess in the pipe around the lower edge of the collar.

3. A bracket having a tapered socket therein, a bowl having a flared neck on its lower side, and an intervening flexible collar having its lower end tapered to fit in the bracket-socket and its upper end flared to fit around the bowl-neck, the lower end of the neck being formed smaller than the tapered end of the collar.

4. A bracket having a tapered socket therein, a bowl having a flared neck on its lower side, and an intervening flexible elastic collar having its lower end tapered to fit in the bracket-socket and its upper end flared to fit around the bowl-neck.

5. A bracket having a tapered socket therein, a bowl having a flared neck on its lower side, and an intervening flexible collar having its lower end tapered to fit in the bracket-socket and its upper end flared to fit around the bowl-neck.

6. A connection between a bracket and a bowl having a flared neck on its under side, comprising a flexible elastic collar connected to the bracket and having its upper end flared to fit around the bowl-neck, there being an external annular groove in the bowl-neck and an internal annular bead in the collar adapted to engage in the groove.

7. A connection between a bracket and a bowl having a flared neck on its under side, comprising a flexible elastic collar connected to the bracket and having its upper end flared to fit around the bowl-neck.

8. A connection between a bracket and a bowl having a flared neck on its under side, comprising a flexible collar connected to the bracket and having its upper end flared to fit around the bowl-neck.

HENRY E. WEBER.

Witnesses:
RUTH A. MILLER,
JOSEPH FREASE.